US012639480B2

(12) United States Patent
Tsuri

(10) Patent No.: US 12,639,480 B2
(45) Date of Patent: May 26, 2026

(54) DISPLAY CONTROL SYSTEM, DISPLAY CONTROL METHOD, AND RECORDING MEDIUM

(71) Applicant: NEC Corporation, Tokyo (JP)

(72) Inventor: Daisuke Tsuri, Tokyo (JP)

(73) Assignee: NEC CORPORATION, Tokyo (JP)

( * ) Notice: Subject to any disclaimer, the term of this patent is extended or adjusted under 35 U.S.C. 154(b) by 233 days.

(21) Appl. No.: 18/025,870

(22) PCT Filed: Sep. 16, 2021

(86) PCT No.: PCT/JP2021/034148
§ 371 (c)(1),
(2) Date: Mar. 10, 2023

(87) PCT Pub. No.: WO2022/059739
PCT Pub. Date: Mar. 24, 2022

(65) Prior Publication Data
US 2023/0351061 A1 Nov. 2, 2023

(30) Foreign Application Priority Data

Sep. 17, 2020 (JP) ................................. 2020-156527

(51) Int. Cl.
*G06F 21/84* (2013.01)
*G06F 21/32* (2013.01)
*G06V 40/16* (2022.01)

(52) U.S. Cl.
CPC .............. *G06F 21/84* (2013.01); *G06F 21/32* (2013.01); *G06V 40/172* (2022.01)

(58) Field of Classification Search
CPC ...... G06F 21/84; G06F 21/32; G06F 3/04842; G06V 40/172; G06V 40/173; G09G 5/00; G09G 5/36
See application file for complete search history.

(56) References Cited

U.S. PATENT DOCUMENTS

2005/0132036 A1 6/2005 Jang et al.
2014/0241591 A1* 8/2014 Matsuki ............... G06V 40/145
382/115
(Continued)

FOREIGN PATENT DOCUMENTS

CN 108346394 A 7/2018
JP 2007-322769 A 12/2007
(Continued)

OTHER PUBLICATIONS

A. J. Nicholson, M. D. Corner and B. D. Noble, "Mobile Device Security Using Transient Authentication," in IEEE Transactions on Mobile Computing, vol. 5, No. 11, pp. 1489-1502, Nov. 2006, doi: 10.1109/TMC.2006.169. (Year: 2006).*
(Continued)

*Primary Examiner* — Kambiz Zand
(74) *Attorney, Agent, or Firm* — Sughrue Mion, PLLC

(57) ABSTRACT
A display control system includes: an acquisition unit that periodically obtains a result of a biometric authentication of a user who uses a processing apparatus; and a control unit that controls a display aspect of a display unit that displays an output result of the processing apparatus in accordance with the result of the biometric authentication. According to such a display control system, it is possible to properly control a screen display of the display unit in accordance with the result of the biometric authentication of the user.

20 Claims, 15 Drawing Sheets

(56) References Cited

U.S. PATENT DOCUMENTS

| | | | |
|---|---|---|---|
| 2015/0033309 A1 | 1/2015 | Fujiwara et al. | |
| 2018/0239719 A1* | 8/2018 | Soffer | G06F 13/4022 |
| 2019/0172426 A1* | 6/2019 | Ni | G06T 7/50 |
| 2019/0303551 A1* | 10/2019 | Tussy | H04W 12/06 |
| 2019/0354356 A1 | 11/2019 | Watanabe | |
| 2020/0288264 A1 | 9/2020 | Abe et al. | |
| 2022/0269800 A1* | 8/2022 | Cui | G06V 40/161 |

FOREIGN PATENT DOCUMENTS

| | | |
|---|---|---|
| JP | 2008-181231 A | 8/2008 |
| JP | 2009-015377 A | 1/2009 |
| JP | 2011-053925 A | 3/2011 |
| JP | 2011-070507 A | 4/2011 |
| JP | 2011-232837 A | 11/2011 |
| JP | 2015-026316 A | 2/2015 |
| JP | 2019-199024 A | 11/2019 |
| JP | 2019-211863 A | 12/2019 |
| KR | 10-2014-0024137 A | 2/2014 |

| | | |
|---|---|---|
| WO | 2016/117061 A1 | 7/2016 |
| WO | 2019/106848 A1 | 6/2019 |

OTHER PUBLICATIONS

R. H. C. Yap, T. Sim, G. X. Y. Kwang and R. Ramnath, "Physical Access Protection using Continuous Authentication," 2008 IEEE Conference on Technologies for Homeland Security, Waltham, MA, USA, 2008, pp. 510-512, doi: 10.1109/THS.2008.4534505. (Year: 2008).*

S. Kumar, T. Sim, R. Janakiraman and Sheng Zhang, "Using continuous biometric verification to protect interactive login sessions," 21st Annual Computer Security Applications Conference (ACSAC'05), Tucson, AZ, 2005, pp. 10 pp. -450, doi: 10.1109/CSAC.2005.61. (Year: 2005).*

International Search Report for PCT Application No. PCT/JP2021/034148, mailed on Nov. 9, 2021.

JP Office Action for JP Application No. 2020-156527, mailed on Nov. 30, 2021 with English Translation.

JP Office Action for JP Application No. 2022-081506, mailed on Jun. 20, 2023 with English Translation.

* cited by examiner

DISPLAY CONTROL SYSTEM, DISPLAY CONTROL METHOD, AND RECORDING MEDIUM

This application is a National Stage Entry of PCT/JP2021/034148 filed on Sep. 16, 2021, which claims priority from Japanese Patent Application 2020-156527 filed on Sep. 17, 2020, the contents of all of which are incorporated herein by reference, in their entirety.

TECHNICAL FIELD

This disclosure relates to a display control system, a display control method, and a recording medium that control a display aspect of a display unit.

BACKGROUND ART

A known system of this type performs an authentication process of authenticating a user who uses an apparatus. For example, Patent Literature 1 discloses a technique/technology of performing the authentication process by using a face image of an operator and determining whether or not the operator is a matching person. Patent Literature 2 discloses a technique/technology of allowing a user to access an application on the basis of the face authentication of the user. Patent Literature 3 discloses a technique/technology of determining whether or not the face authentication allows operation of an informational terminal.

CITATION LIST

Patent Literature

Patent Literature 1: JP2007-322769A
Patent Literature 2: JP2015-026316A
Patent Literature 3: PCT International Publication WO2019/106848

SUMMARY

Technical Problem

In each of the cited literatures, there is room to improve in that a qualified person is properly authenticated.

It is an example object of the present disclosure to provide a display control system, a display control method, and a recording medium that take into account the above-described problems.

Solution to Problem

A display control system according to an example aspect of this disclosure includes: an acquisition unit that periodically obtains a result of a biometric authentication of a user who uses a processing apparatus; and a control unit that controls a display aspect of a display unit that displays an output result of the processing apparatus in accordance with the result of the biometric authentication.

A display control method according to an example aspect of this disclosure includes: periodically obtaining a result of a biometric authentication of a user who uses a processing apparatus; and controlling a display aspect of a display unit that displays an output result of the processing apparatus in accordance with the result of the biometric authentication.

A recording medium according to an example aspect of this disclosure is a recording medium on which a computer program is recorded, the computer program operating a computer: to periodically obtain a result of a biometric authentication of a user who uses a processing apparatus; and to control a display aspect of a display unit that displays an output result of the processing apparatus in accordance with the result of the biometric authentication.

DESCRIPTION OF EXAMPLE EMBODIMENTS

Hereinafter, a display control system, a display control method, a computer program, and a recording medium according to example embodiments will be described with reference to the drawings.

First Example Embodiment

A display control system according to a first example embodiment will be described with reference to FIG. 1 to FIG. 3.

(Hardware Configuration)

First, with reference to FIG. 1, a hardware configuration of the display control system according to the first example embodiment will be described. FIG. 1 is a block diagram illustrating the hardware configuration of the display control system according to the first example embodiment.

Figure 1:
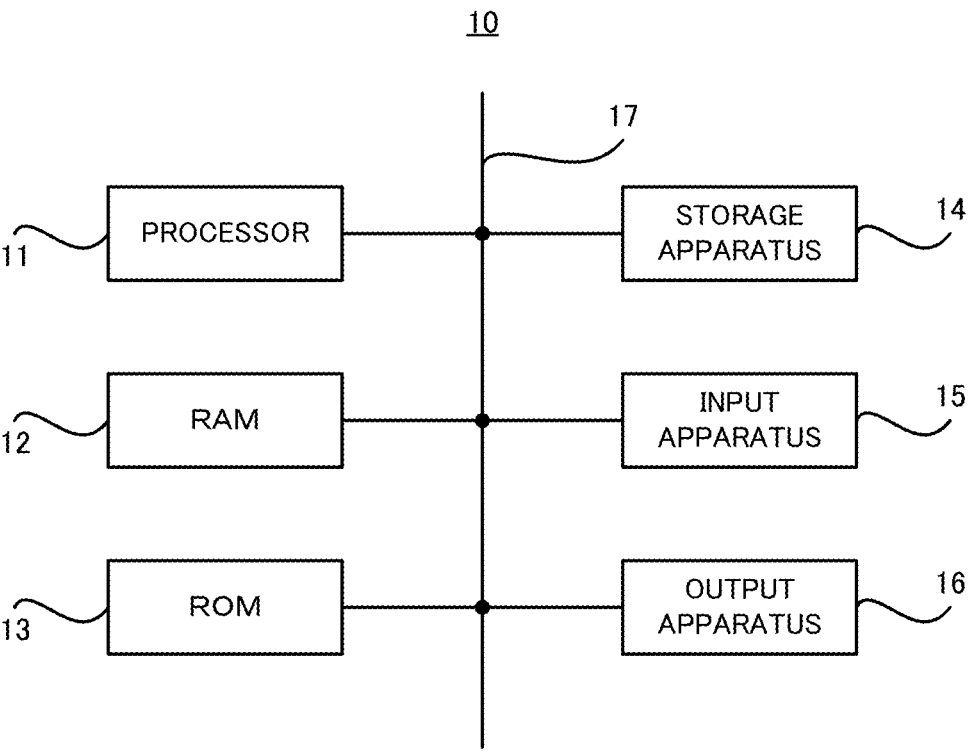
FIG. 1 is a block diagram illustrating a hardware configuration of a display control system according to a first example embodiment.

As illustrated in FIG. 1, a display control system 10 according to the first example embodiment includes a processor 11, a RAM (Random Access Memory) 12, a ROM (Read Only Memory) 13, and a storage apparatus 14. The display control system 10 may further include an input apparatus 15 and an output apparatus 16. The processor 11, the RAM 12, the ROM 13, the storage apparatus 14, the input apparatus 15, and the output apparatus 16 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer readable recording medium by using a not-illustrated recording medium reading apparatus. The processor 11 may obtain (i.e., may read) a computer program from a not-illustrated apparatus disposed outside the display control system 10, through a network interface. The processor 11 controls the RAM 12, the storage apparatus 14, the input apparatus 15, and the output apparatus 16 by executing the read computer program. Especially in the example embodiment, when the processor 11 executes the read computer program, a functional block for controlling a display of a display unit is realized or implemented in the processor 11. As the processor 11, one of a CPU (Central Processing Unit), a GPU (Graphics Processing Unit), a FPGA (field-programmable gate array), a DSP (Demand-Side Platform), and an ASIC (Application Specific Integrated Circuit) may be used, or a plurality of them may be used in parallel.

The RAM 12 temporarily stores the computer programs to be executed by the processor 11. The RAM 12 temporarily stores the data that is temporarily used by the processor 11 when the processor 11 executes the computer program. The RAM 12 may be, for example, a D-RAM (Dynamic RAM).

The ROM 13 stores the computer program to be executed by the processor 11. The ROM 13 may otherwise store fixed data. The ROM 13 may be, for example, a P-ROM (Programmable ROM).

The storage apparatus 14 stores the data that is stored for a long term by the display control system 10. The storage apparatus 14 may operate as a temporary storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the display control system 10. The input apparatus 15 may include, for example, at least one of a keyboard, a mouse, and a touch panel.

The output apparatus 16 is an apparatus that outputs information about the display control system 10 to the outside. For example, the output apparatus 16 may be a display apparatus (e.g., a display) that is configured to display the information about the display control system 10.

(Functional Configuration)

Next, with reference to FIG. 2, a functional configuration of the display control system 10 according to the first example embodiment will be described. FIG. 2 is a block diagram illustrating the functional configuration of the display control system according to the first example embodiment.

Figure 2:
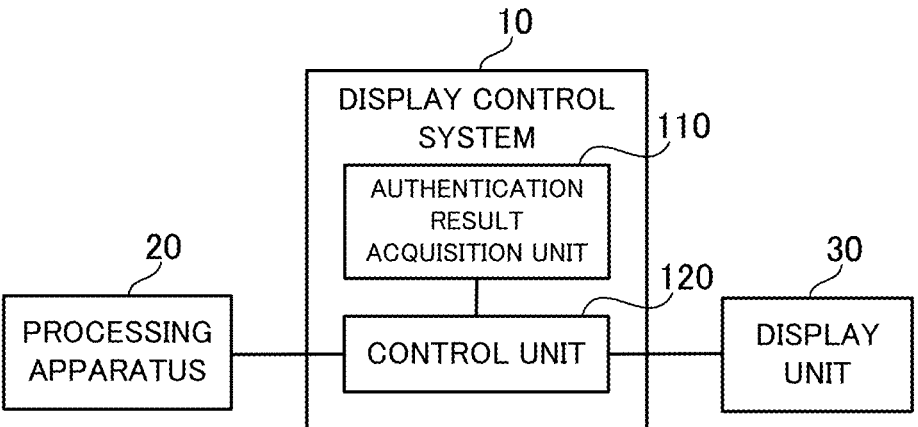
FIG. 2 is a block diagram illustrating a functional configuration of the display control system according to the first example embodiment.

As illustrated in FIG. 2, the display control system 10 according to the first example embodiment is connected to a processing apparatus 20 and a display unit 30. The processing apparatus 20 is an apparatus that is configured to perform various processes, and is configured as a main body of a terminal used by a user, for example. The display unit 30 is configured as a display (monitor) that is capable of displaying an output result of the processing apparatus 20. The processing apparatus 20 and the display unit 30 may be provided in the display control system 10.

The display control system 10 is configured, for example, as an edge apparatus provided between the processing apparatus 20 and the display unit 30. The display control system 10 includes, as processing blocks for realizing its functions, an authentication result acquisition unit 110 and a control unit 120. The authentication result acquisition unit 110 and the control unit 120 may be realized or implemented in the processor 11 (see FIG. 1), for example.

The authentication result acquisition unit 110 is configured to obtain a result of biometric authentication of a user who uses the processing apparatus 20. The result of the biometric authentication may include not only information indicating a success or a failure of the biometric authentication, but also various informations used for the biometric authentication (e.g., a biometric information about the user, information for identifying the user, an image used for the biometric authentication, etc.). The authentication result acquisition unit 110 periodically obtains the result of the biometric authentication. The result of the biometric authentication obtained by the authentication result acquisition unit 110 is configured to be outputted to the control unit 120.

The control unit 120 is configured to control a display aspect of the display unit 30 in accordance with the result of the biometric authentication obtained by the authentication result acquisition unit 110. Specifically, the control unit 120 changes the display aspect of the display unit 30 between the success and the failure of the biometric authentication. The control unit 120 is configured to receive the output result of the processing apparatus 20, and to output the received output result to the display unit 30. The control unit 120 is configured not only to output the output result received from the processing apparatus as it is, but also to perform various processes or to replace it with other data before outputting it.

(Flow of Operation)

Next, with reference to FIG. 3, a flow of operation of the display control system 10 according to the first example embodiment will be described. FIG. 3 is a flowchart illustrating the flow of the operation of the display control system according to the first example embodiment.

Figure 3:
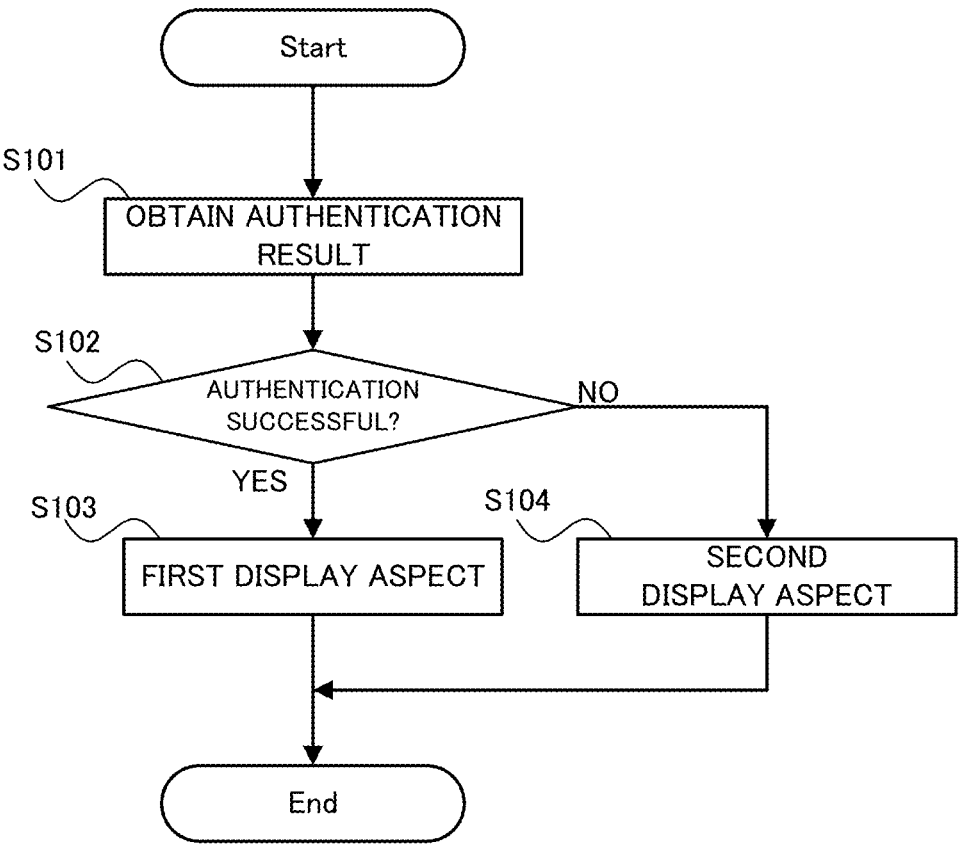
FIG. 3 is a flowchart illustrating a flow of operation of the display control system according to the first example embodiment.

As illustrated in FIG. 3, in operation of the display control system 10 according to the first example embodiment, first, the authentication result acquisition unit 110 obtains the result of the biometric authentication of the user (step S101). The result of the biometric authentication is outputted to the control unit 120.

Subsequently, the control unit 120 determines whether or not the biometric authentication is successful (step S102). When the biometric authentication is successful (the step S102: YES), the control unit 120 sets the display aspect of the display unit 30 to a first display aspect (step S103). The first display aspect is a display aspect corresponding to a user who succeeds in the biometric authentication (in other words, a user who is qualified to use the processing apparatus 20), and is set as an aspect in which the user can continue to operate the processing apparatus 20, for example.

On the other hand, when the biometric authentication is failed (the step S102: NO), the control unit 120 sets the display aspect of the display unit 30 to a second display aspect (step S104). The second display aspect is a display aspect corresponding to a user who fails in the biometric authentication (in other words, a user who is not qualified to use the processing apparatus 20), and is set as an aspect in which the user cannot continue to operate the processing apparatus 20, for example.

A series of processing steps described above is repeated at each time when the biometric authentication is performed. Therefore, even if the biometric authentication is successful and display is made in the first display aspect, if the biometric authentication is failed in the subsequent process, the display aspect is changed to the second display aspect. Furthermore, even if the biometric authentication is failed and display is made in the second display aspect, if the biometric authentication is successful in the subsequent process, the display aspect is changed to the first display aspect.

(Technical Effect)

Next, a technical effect obtained by the display control system 10 according to the first example embodiment will be described.

As described in FIG. 1 to FIG. 3, in the display control system 10 according to the first example embodiment, the display aspect of the display unit 30 is changed in accordance with the result of the biometric authentication of the user. Consequently, the display is made separately for the user who is successfully authenticated in the biometric authentication and for the user who is failed in the authentication. In this way, for example, it is possible to realize such a mechanism that a use qualification of the processing apparatus 20 is determined in the biometric authentication and that a qualified user is allowed to continue to operate the processing apparatus 20, whereas an unqualified user is not allowed to continue to operate the processing apparatus 20.

Furthermore, when the display control system 10 according to the first example embodiment is configured as a single apparatus like an edge apparatus, the above-described operation can be realized only by connecting the display control system 10 between the processing apparatus 20 and the display unit 30. Therefore, even in a situation where it is hard to introduce new application software for the biometric authentication (e.g., a situation in which it is hardly possible to change settings or the like in terms of system specifications), the above-described technical effect can be reliably demonstrated.

The technical effect described above is remarkably demonstrated in qualification management of an operator for a factory equipment such as a manufacturing inspection terminal and a control terminal, qualification management of an operator in a power plant management facility, in such a situation that screen display is made only when an operator views the display at a terminal for managing concealed information, and in similar situations, for example.

Second Example Embodiment

The display control system 10 according to a second example embodiment will be described with reference to FIG. 4 to FIG. 6. The second example embodiment describes a specific example of the display aspect in the first example embodiment, and may be the same as the first example embodiment in the configuration and the flow of operation (see FIG. 1 to FIG. 3). For this reason, a description of the parts that overlap the first example embodiment will be omitted as appropriate.

(First Display Example)

First, a first display example will be described with reference to FIG. 4. FIG. 4 is a conceptual diagram illustrating the first display example by the display control system according to the second example embodiment.

Figure 4:
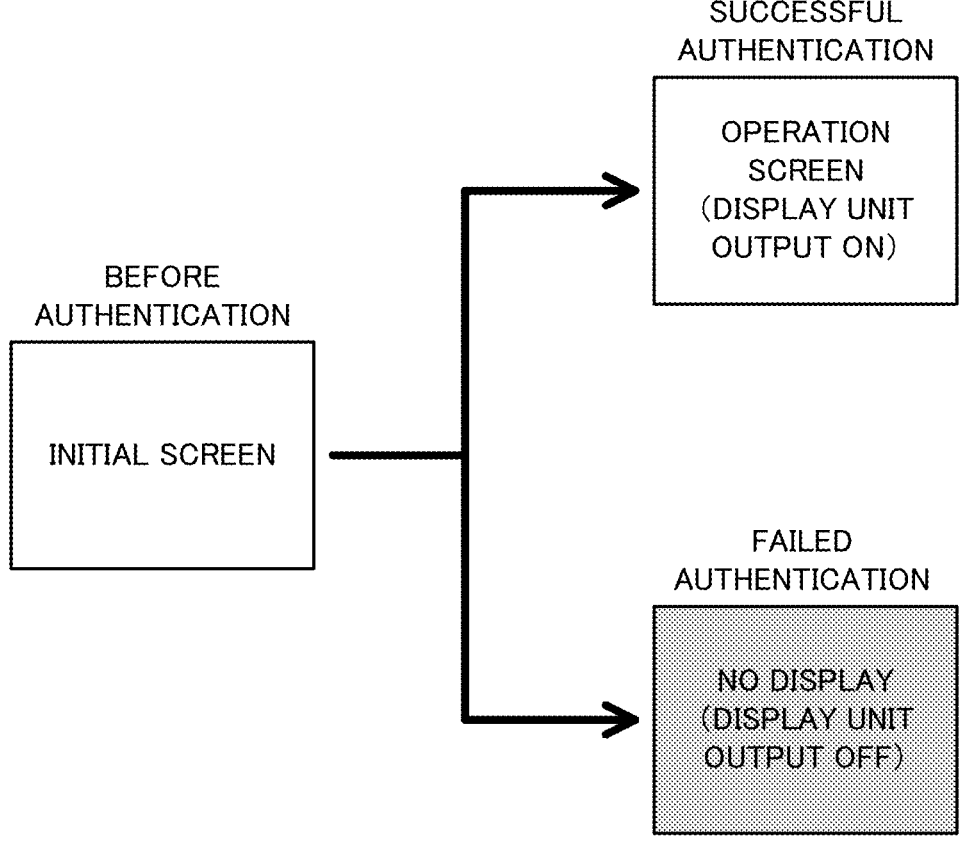
FIG. 4 is a conceptual diagram illustrating a first display example by a display control system according to a second example embodiment.

In FIG. 4, in the first display example, the display aspect is changed depending on whether or not to output the output result of the processing apparatus 20 to the display unit 30. Specifically, when the biometric authentication is successful, an initial screen (e.g., a login screen) before the authentication is changed to an operation screen. The operation screen here is a specific example of the first display aspect, and is realized by outputting the output result of the processing apparatus 20 to the display unit 30 as it is. The operation screen allows the user to perform various processes by using the processing apparatus 20.

On the other hand, when the biometric authentication is failed, the initial screen before the authentication is changed into a no-display state. Here, "no display" is a specific example of the second display aspect, and is realized by blocking the output result of the processing apparatus 20 (i.e., by not outputting the output result to the display unit 30). In the no-display state, the user cannot perform various processes by using the processing apparatus 20.

According to the first display example, the user who succeeds in the biometric authentication is allowed to operate the processing apparatus 20, and the user who fails in the biometric authentication is not allowed to operate the processing apparatus 20.

(Second Display Example)

Next, a second display example will be described with reference to FIG. 5. FIG. 5 is a conceptual diagram illustrating the second display example by the display control system according to the second example embodiment.

Figure 5:
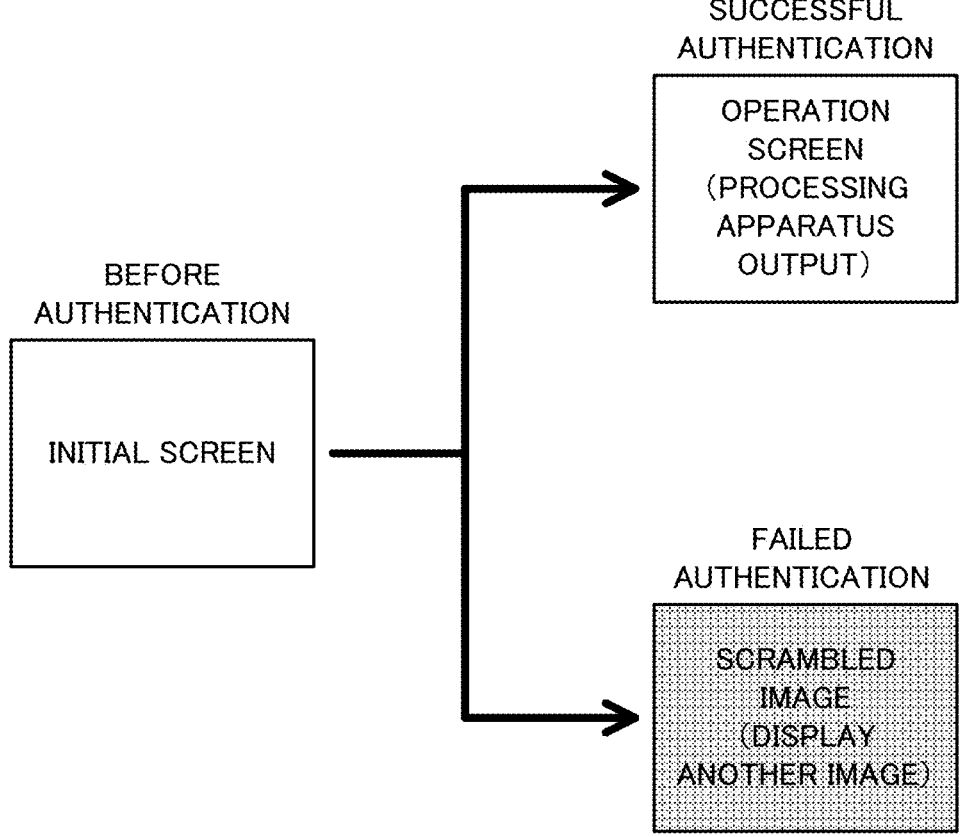
FIG. 5 is a conceptual diagram illustrating a second display example by the display control system according to the second example embodiment.

In FIG. 5, in the second display example, the display aspect is changed depending on whether to output the output result of the processing apparatus 20 to the display unit 30, or to output another image. Specifically, when the biometric authentication is successful, the initial screen before the authentication is changed to the operation screen. The "operation screen" here is a specific example of the first display aspect, and is realized by outputting the output result of the processing apparatus 20 to the display unit 30 as it is, as in the first display example. The operation screen allows the user to perform various processes by using the processing apparatus 20.

On the other hand, when the biometric authentication is failed, the initial screen before the authentication is changed to a scrambled image. The "scrambled image" here is a specific example of the second display aspect, is realized by outputting another image to the display unit 30 in place of the output result of the processing apparatus 20. While the scrambled image is displayed, the user cannot perform various processes by using the processing apparatus 20. The scrambled image is merely one example, and another image (e.g., a white image or a black image, or an image that is not related to the operation at all) may be displayed on the display 30.

Even in the second display example, as in the first display example, the user who succeeds in the biometric authentication is allowed to operate the processing apparatus 20, and the user who fails in the biometric authentication is not allowed to operate the processing apparatus 20.

(Third Display Example)

Next, a third display example will be described with reference to FIG. 6. FIG. 6 is a conceptual diagram illustrating the third display example by the display control system according to the second example embodiment.

Figure 6:
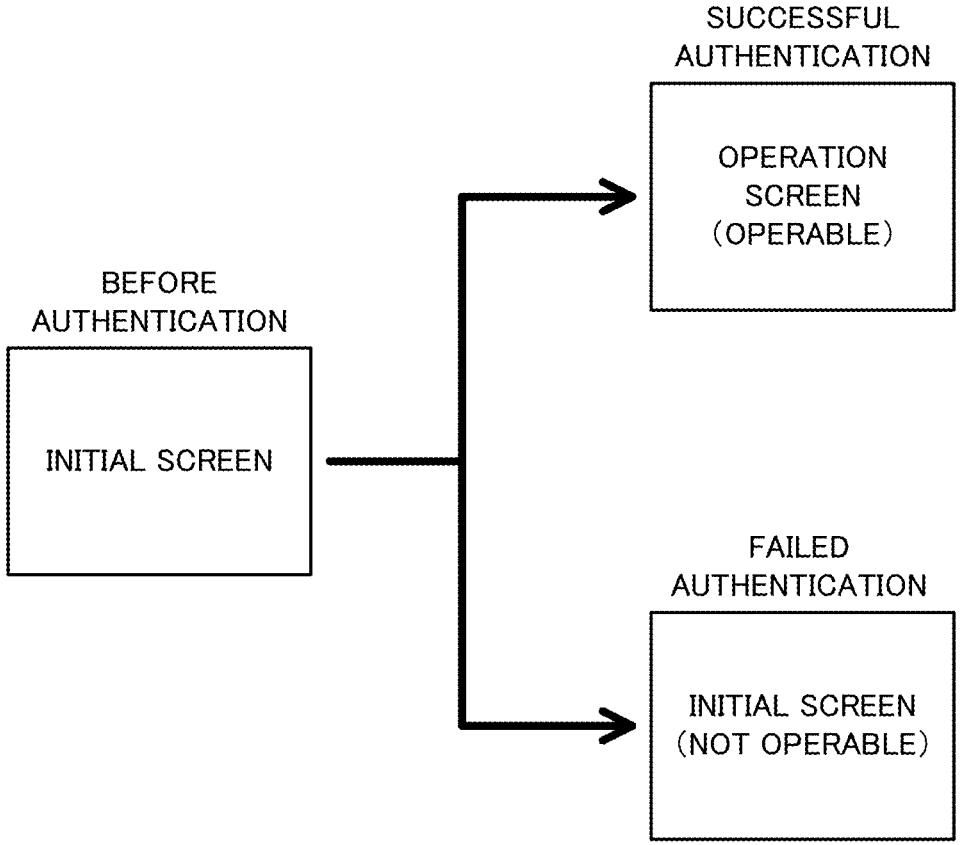
FIG. 6 is a conceptual diagram illustrating a third display example by the display control system according to the second example embodiment.

In FIG. 6, in the third display example, the display aspect is changed depending on whether to output the output result of the processing apparatus 20 to the display unit 30 or to freeze the screen. Specifically, when the biometric authentication is successful, the initial screen before the authentication is changed to the operation screen. The "operation screen" here is a specific example of the first display aspect, and is realized by outputting the output result of the processing apparatus 20 to the display unit 30 as it is, as in the first and second display examples. The operation screen allows the user to perform various processes by using the processing apparatus 20.

On the other hand, when the biometric authentication is failed, the initial screen before the authentication is frozen (i.e., the initial screen remains unchanged). The "freeze" is a specific example embodiment of the second display aspect, and is realized by fixing the output result of the processing apparatus 20 as it is. While the screen display is frozen, the user cannot perform various processes by using the processing apparatus 20.

Even in the third display example, as in the first and second display examples, the user who succeeds in the biometric authentication is allowed to operate the processing apparatus 20, and the user who fails in the biometric authentication is not allowed to operate the processing apparatus 20.

In the first to third display examples, a user specific correspondence can be realized only by changing the display aspect of the display unit 30, and it is thus possible to effectively suppress a complicated system configuration and an increased cost. In addition to the control of the display aspect, a control other than the display unit 30 may be performed. For example, when the biometric authentication is failed, an input apparatus (e.g., a keyboard, a mouse, etc.) for operating the processing apparatus 20 may be in an operation disabled state.

Third Example Embodiment

The display control system 10 according to a third example embodiment will be described with reference to FIG. 7. The third example embodiment is partially different from the first and second example embodiments only in the operation, and may be the same as the first example embodiment in the configuration (see FIG. 1 and FIG. 2). For this reason, a description of the parts that overlap the already-described parts will be omitted as appropriate.

(Flow of Operation)

Figure 7:
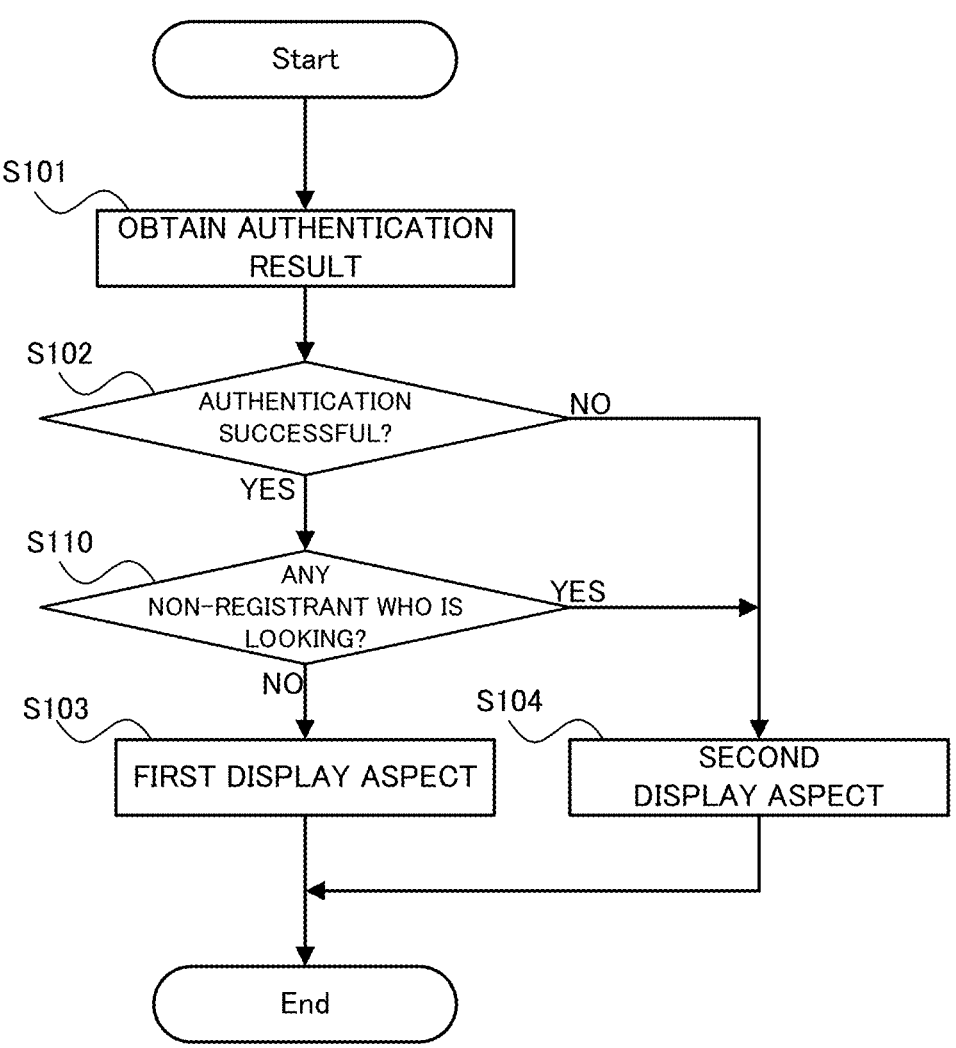
FIG. 7 is a flowchart illustrating a flow of operation of a display control system according to a third example embodiment.

With reference to FIG. 7, a flow of operation of the display control system 10 according to the third example embodiment will be described. FIG. 7 is a flowchart illustrating the flow of the operation of the display control system according to the third example embodiment.

As illustrated in FIG. 7, in operation of the display control system 10 according to the third example embodiment, first, the authentication result acquisition unit 110 obtains the result of the biometric authentication of the user (the step S101). The result of the biometric authentication is outputted to the control unit 120.

Subsequently, the control unit 120 determines whether or not the biometric authentication is successful (the step S102). When the biometric authentication is failed (the step S102: NO), the control unit 120 sets the display aspect of the display unit 30 to the second display aspect (the step S104).

On the other hand, when the biometric authentication is successful (the step S102: YES), the control unit 120 determines whether or not there is a non-registrant (i.e., a person other than the user who succeeds in the biometric authentication) who is looking at the display unit 30 (step S110). The presence of the non-registrant can be determined from information used in the biometric authentication (e.g., an image obtained by imaging a surrounding scene of the display unit 30) or the like.

More specifically, when a person other than the user who succeeds in the biometric authentication appears in the image of the surroundings of the display unit 30 for a predetermined period or more, it may be determined that there is a non-registrant who is looking. The "predetermined time" here is a time period long enough to allow such a determination that a person in the image is looking at the display unit 30, and is set in advance by simulation or the like. In this case, even if the non-registrant appears in the image, if the non-registrant disappears within the predetermined time, then, it may be determined that there is not a non-registrant who is looking. In other words, a person who temporarily appears in the image may not be determined to be a non-registrant who is looking.

In addition, when a person other than the user who succeeds in the biometric authentication appears within a predetermined distance from the display unit 30, it may be determined that there is a non-registrant who is looking. The "predetermined distance" here is a distance close enough to allow such a determination that a person in the image is looking at the display unit 30, and is set in advance by simulation or the like. In this case, even if the non-registrant appears in the image, if the non-registrant is in a place that is farther than the predetermined distance, then, it may be determined that there is not a non-registrant who is looking.

Alternatively, when a line of sight of the non-registrant who appears in the image for the authentication is directed to the display unit 30, it may be determined that there is a non-registrant who is looking. In this case, even if the non-registrant appears in the image, if the line of sight is directed in a direction that is different from the display unit 30, then, it may be determined that there is not a non-registrant who is looking. A detailed description of estimation of a gaze direction will be omitted herein because the existing techniques/technologies can be adopted to the estimation as appropriate.

When it is determined that there is not a non-registrant who is looking (the step S110: NO), the control unit 120 sets the display aspect of the display unit 30 to be the first display aspect (the step S103). On the other hand, when it is determined that there is a non-registrant who is looking (the step S110: YES), the control unit 120 sets the display aspect of the display unit 30 to the second display aspect (the step S104). In other words, the display aspect is the same as that when the biometric authentication is not successful.

(Technical Effect)

Next, a technical effect obtained by the display control system 10 according to the third example embodiment will be described.

As described in FIG. 7, in the display control system 10 according to the third example embodiment, when there is a non-registrant exists even though the biometric authentication is successful, the display unit 30 is changed into the second display aspect. In this way, it is possible to prevent that information is leaked from the non-registrant who is looking at the display unit 30 when a qualified user uses the processing apparatus 20.

Fourth Example Embodiment

The display control system 10 according to a fourth example embodiment will be described with reference to FIG. 8 and FIG. 9. The fourth example embodiment is partially different from the first to third example embodiments only in the operation, and may be the same as the first example embodiment in the hardware configuration or the like (see FIG. 1), for example. For this reason, a description of the parts that overlap the already-described parts will be omitted as appropriate.

(Functional Configuration)

First, with reference to FIG. 8, a functional configuration of the display control system 10 according to the fourth example embodiment will be described. FIG. 8 is a block diagram illustrating the functional configuration of the display control system according to the fourth example embodiment. In FIG. 8, the same components as those illustrated in FIG. 2 carry the same reference numerals.

Figure 8:
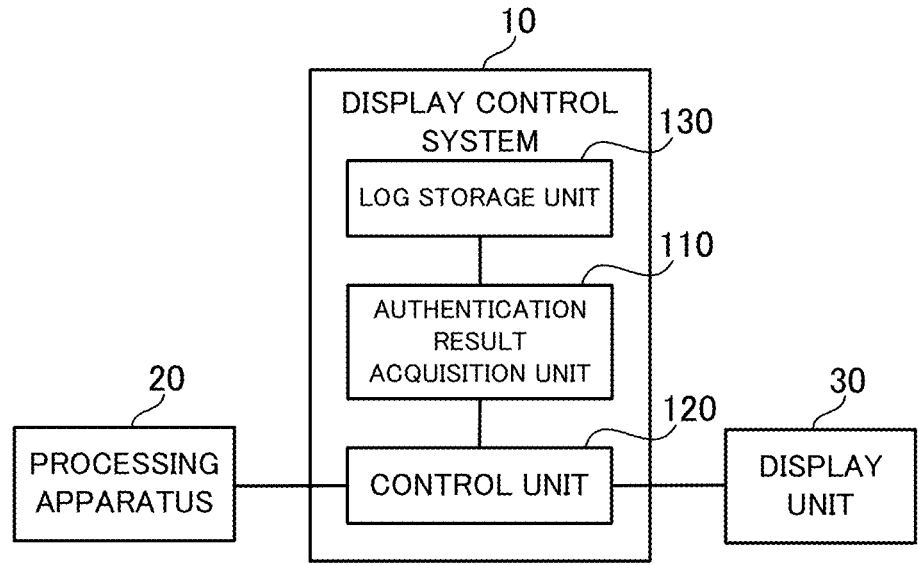
FIG. 8 is a block diagram illustrating a functional configuration of a display control system according to a fourth example embodiment.

As illustrated in FIG. 8, the display control system 10 according to the fourth example embodiment includes, as processing blocks for realizing its functions, the authentication result acquisition unit 110, the control unit 120, and a log storage unit 130. That is, the display control system 10 according to the fourth example embodiment includes a log storage unit 130 in addition to the components in the first example embodiment (see FIG. 2). The log storage unit 130 may be realized or implemented by the storage apparatus 14 (see FIG. 1), for example.

The log storage unit 130 is configured to store the result of the biometric authentication. The log storage unit 130 stores, for example, whether the biometric authentication is successful or failed, together with a date and time when the biometric authentication is performed. Furthermore, the log storage unit 130 may be configured to store an identification information about a user who is a target of the biometric authentication and a biometric information used for the biometric authentication (e.g., an image of the user, etc.). The log storage unit 130 may be further configured to store, as image data, a display screen of the display unit 30 after the biometric authentication is performed. A result of the biometric authentication stored in the log storage unit 130 is configured to be read as appropriate in any timing.

(Flow of Operation)

Next, with reference to FIG. 9, a flow of operation of the display control system 10 according to the fourth example embodiment will be described. FIG. 9 is a flowchart illustrating the flow of the operation of the display control system according to the fourth example embodiment. In FIG. 9, the same steps as those illustrated in FIG. 3 carry the same reference numerals.

Figure 9:
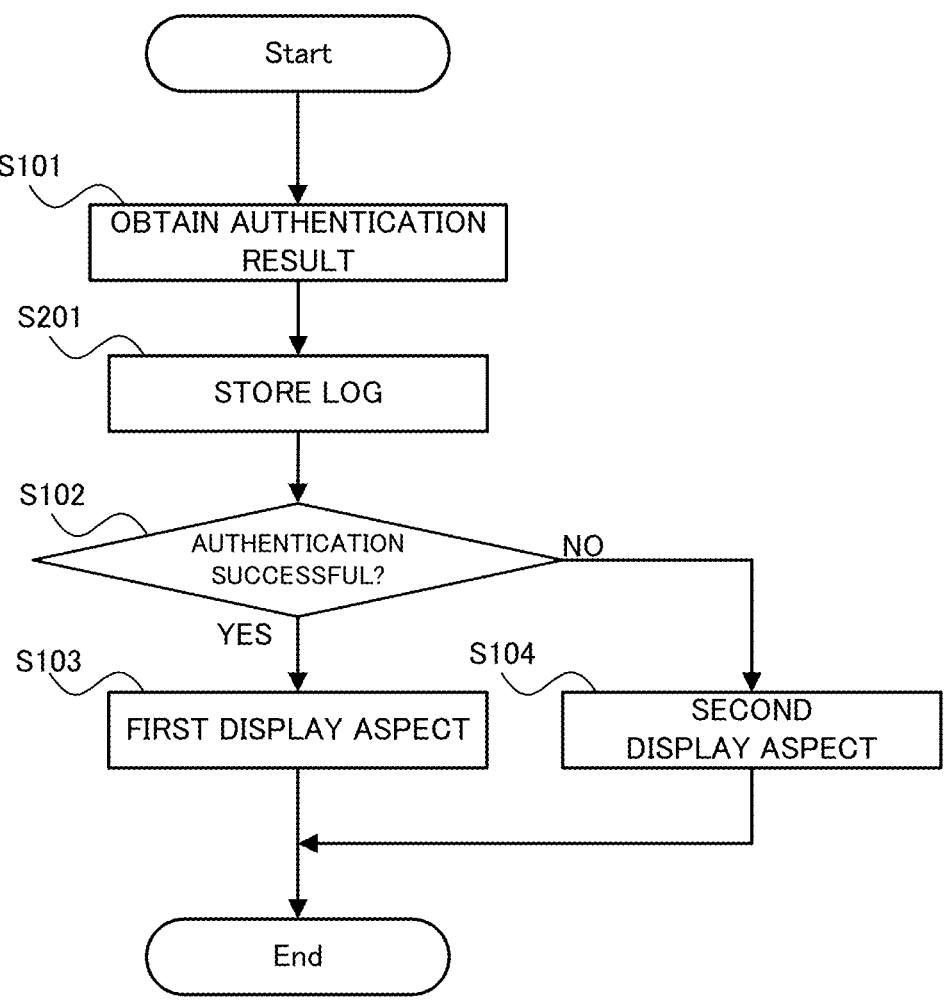
FIG. 9 is a flowchart illustrating a flow of operation of the display control system according to the fourth example embodiment.

As illustrated in FIG. 9, in operation of the display control system 10 according to the fourth example embodiment, first, the authentication result acquisition unit 110 obtains the result of the biometric authentication of the user (the step S101). Especially in the fourth example embodiment, the log storage unit 130 stores the result of the biometric authentication (step S201). Thus, the log storage unit 130 stores (in other words, accumulates) the result of the biometric authentication every time the biometric authentication is performed.

Subsequently, the control unit 120 determines whether or not the biometric authentication is successful (the step S102). When the biometric authentication is successful (the step S102: YES), the control unit 120 sets the display aspect of the display unit 30 to be the first display aspect (the step S103). On the other hand, when the biometric authentication is failed (the step S102: NO), the control unit 120 sets the display aspect of the display unit 30 to the second display aspect (the step S104).

(Technical Effect)

Next, a technical effect obtained by the display control system 10 according to the fourth example embodiment will be described.

As described with reference to FIG. 8 and FIG. 9, in the display control system 10 according to the fourth example embodiment, the result of the biometric authentication is stored in the log storage unit 130. In this way, it is possible to read and view later various information obtained when the biometric authentication is performed. This enables trail management of a user who attempts to use the processing apparatus 20.

Fifth Example Embodiment

The display control system 10 according to a fifth example embodiment will be described with reference to FIG. 10. The fifth example embodiment describes a specific utilization example of the log stored in the fourth example embodiment, and may be the same as the fourth example embodiment in the configuration and the flow of operation, or the like (see FIG. 1, FIG. 8 and FIG. 9). For this reason, a description of the parts that overlap the already-described parts will be omitted as appropriate.

(Display Example of History Information)

Figure 10:
FIG. 10 is a conceptual diagram illustrating a display example of a display control system according to a fifth example embodiment.

With reference to FIG. 10, a specific display example of a history information (i.e., a log of the result of the biometric authentication) will be described. FIG. 10 is a conceptual diagram illustrating the display example of the display control system according to the fifth example embodiment.

As illustrated in FIG. 10, on a screen for confirming the history information stored in the log storage unit 130, a display may be made to register a recorded unregistered user as a new registered user. Specifically, when an unregistered user is selected on a screen that displays a list of recorded users, a pop-up display may be made as to whether or not this user is registered as a new user.

In the example illustrated in FIG. 10, when "REGISTER" is selected, the unregistered user is registered as a new registered user. In this case, information stored in the log storage unit 130 (e.g., an image or a personal ID information, etc.) may be used as a registration information. On the other hand, when "NOT REGISTER" is selected, the unregistered user is treated as an unregistered user. The above-described display example is merely an example, and the registration of a new user may be prompted by different displays.

(Technical Effect)

Next, a technical effect obtained by the display control system 10 according to the fifth example embodiment will be described.

As described in FIG. 10, in the display control system 10 according to the fifth example embodiment, it is possible to register a new registered user from the information recorded in the log storage unit 130. In this way, it is possible to reduce a labor required to register anew user.

Sixth Example Embodiment

The display control system 10 according to a sixth example embodiment will be described with reference to FIG. 11. The sixth example embodiment is partially different from the first to fifth example embodiments only in the function, and may be the same as those already described in the hardware configuration and the flow of operation, or the like. For this reason, a description of the parts that overlap the already-described parts will be omitted as appropriate.

(Functional Configuration)

First, with reference to FIG. 11, a functional configuration of the display control system 10 according to the sixth example embodiment will be described. FIG. 11 is a block diagram illustrating the functional configuration of the display control system according to a sixth example embodiment. In FIG. 11, the same components as those illustrated in FIG. 2 and FIG. 8 carry the same reference numerals.

Figure 11:
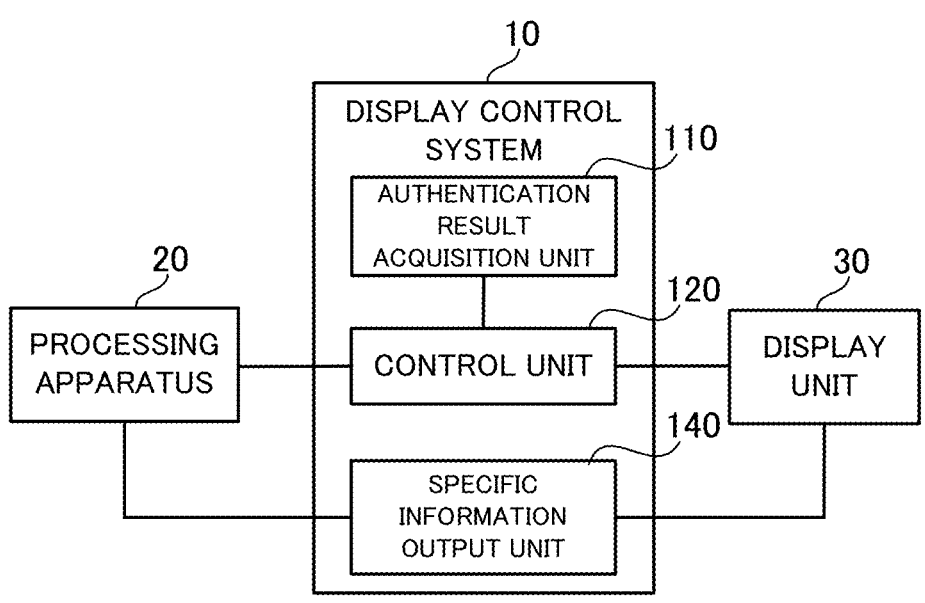
FIG. 11 is a block diagram illustrating a functional configuration of a display control system according to a sixth example embodiment.

As illustrated in FIG. 11, the display control system 10 according to the sixth example embodiment includes, as processing blocks for realizing its functions, the authentication result acquisition unit 110, the control unit 120, and a specific information output unit 140. That is, the display control system 10 according to the sixth example embodiment further includes a specific information output unit 140 in addition to the components in the first example embodiment (see FIG. 2). The specific information output unit 140 may be realized or implemented in the processor 11 (see FIG. 1), for example.

The specific information output unit 140 is configured to output a specific information about the display unit 30 to the processing apparatus 20. The "specific information" here includes a specification information and an identification information about the display unit 30, and includes EDID (Extended Display Identification Data) as an example. In particular, the specific information output unit 140 outputs the specific information about the display unit 30 to the processing apparatus 20, regardless of the result of the biometric authentication. That is, an output of the specific information is performed separately and independently from an output control by the control unit 120 (i.e., an output of the display information). Therefore, even when the biometric authentication is failed, the specific information about the display unit 30 may be outputted to the processing apparatus 20. The specific information output unit 140 outputs the specific information at a time when an output request is made from the processing apparatus 20, or at a time when the display unit 30 is newly connected, for example. Alternatively, the specific information output unit 140 may periodically output the specific information.

(Technical Effect)

Next, a technical effect obtained by the display control system 10 according to the sixth example embodiment will be described.

As described in FIG. 11, in the display control system 10 according to the sixth example embodiment, the specific information output unit 140 outputs the specific information about the display unit 30, regardless of the result of the biometric authentication. In this way, for example, it is possible to properly obtain the information again when the display unit 30 is reconnected. Furthermore, it is possible to perform a control (e.g., power interlocking, etc.) for interlocking the processing apparatus 20 and the display unit 30, regardless of whether or not the biometric authentication is successful (i.e., regardless of whether or not the processing apparatus 20 is in an operable state).

Seventh Example Embodiment

The display control system 10 according to a seventh example embodiment will be described with reference to FIG. 12. The seventh example embodiment is partially different from the first to sixth example embodiments only in the function, and may be the same as those already described in the hardware configuration and the flow of operation, or the like. For this reason, a description of the parts that overlap the already-described parts will be omitted as appropriate.

(Functional Configuration)

First, with reference to FIG. 12, a functional configuration of the display control system 10 according to the seventh example embodiment will be described. FIG. 12 is a block diagram illustrating the functional configuration of the display control system according to the seventh example embodiment. In FIG. 12, the same components as those illustrated in FIG. 2, FIG. 8 and FIG. 11 carry the same reference numerals.

Figure 12:
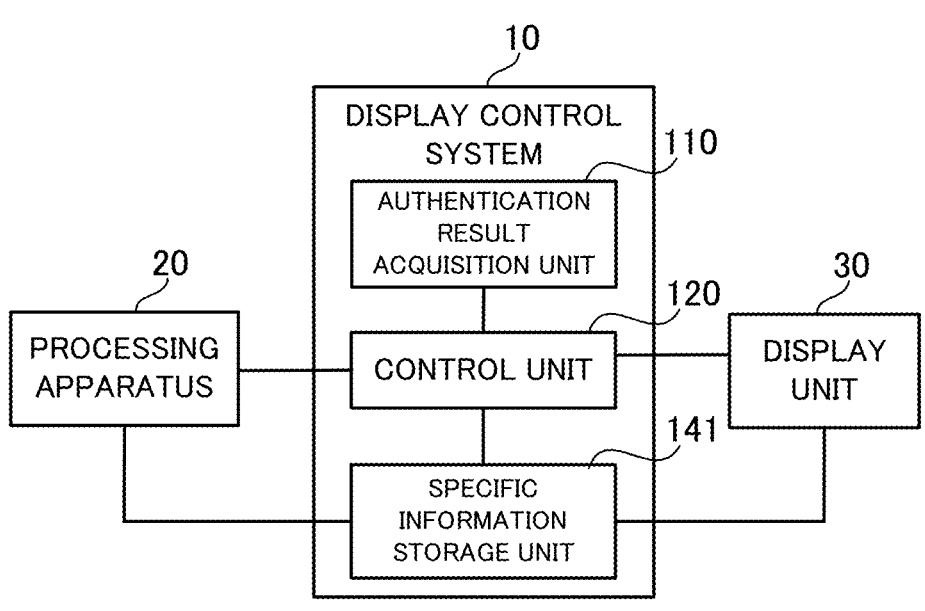
FIG. 12 is a block diagram illustrating a functional configuration of a display control system according to a seventh example embodiment.

As illustrated in FIG. 12, the display control system 10 according to the seventh example embodiment includes, as processing blocks for realizing its functions, the authentication result acquisition unit 110, the control unit 120, and a specific information storage unit 141. That is, the display control system 10 according to the seventh example embodiment further includes a specific information storage unit 141 in addition to the components in the first example embodiment (see FIG. 2). The specific information storage unit 141 may be realized or implemented in the storage apparatus 14 (see FIG. 1), for example.

The specific information storage unit 141 is configured to store the specific information about at least one of the processing apparatus 20 and the display unit 30. The specific information here is used to recognize that the processing apparatus 20 or the display unit 30 is a system-registered apparatus. Specifically, the processing apparatus 20 and the display unit 30 about which the specific information is stored are recognized to be regular apparatuses that are registered in the system. On the other hand, the processing apparatus 20 and the display unit 30 about which the specific information is not stored are recognized to be non-regular apparatuses that are not registered in the system. The specific information storage unit 141 stores the specific information in initial setting, or when a new connection is made by a qualified user or system manager, for example. The specific information stored in the specific information storage unit 141 is configured to be properly read by the control unit 120.

The display control system 10 according to the seventh example embodiment is configured to perform an operation corresponding to the specific information stored in the specific information storage unit 141. For example, the control unit 120 is configured to change the display aspect of the display unit 30, in view of the specific information in addition to the result of the biometric authentication. Specifically, when the processing apparatus 20 and the display unit 30 about which the specific information is stored are connected, the control unit 120 performs a normal operation (i.e., the operation described in the above example embodiments). On the other hand, when the processing apparatus 20 and the display unit 30 about which the specific information is not stored are connected, the control unit 120 may change the display aspect of the display unit 30 to the second aspect, regardless of the result of the biometric authentication. In other words, when the processing apparatus 20 and the display unit 30 about which the specific information is not stored are connected, the processing apparatus 20 may be substantially in a condition of not being handled normally.

Alternatively, when the processing apparatus 20 and the display unit 30 about which the specific information is stored are not connected, the biometric authentication may be configured to be hardly successful. For example, when the processing apparatus 20 and the display unit 30 about which the specific information is not stored are connected, a threshold of the biometric authentication may be configured to be higher than usual.

(Technical Effect)

Next, a technical effect obtained by the display control system 10 according to the seventh example embodiment will be described.

As described in FIG. 12, in the display control system 10 according to the seventh example embodiment, different operations are performed depending on whether or not the specific information about the processing apparatus 20 and the display unit 30 is stored. In this way, it is possible to reduce illegal actions or the like due to a reconnection of the processing apparatus 20 or the display unit 30. For example, it is possible to prevent that an unqualified user attempts to reconnect the processing apparatus 20 or the display unit 30 to another device to illegally obtain information.

Eighth Example Embodiment

The display control system 10 according to an eighth example embodiment will be described with reference to FIG. 13. The eighth example embodiment is partially different from the first to seventh example embodiments only in the function, and may be the same as those already described in the hardware configuration and the flow of operation, or the like. For this reason, a description of the parts that overlap the already-described parts will be omitted as appropriate.

(Functional Configuration)

First, with reference to FIG. 13, a functional configuration of the display control system 10 according to the eighth example embodiment will be described. FIG. 13 is a block diagram illustrating the functional configuration of the display control system according to the eighth example embodiment. In FIG. 13, the same components as those illustrated in FIG. 2, FIG. 8, FIG. 11 and FIG. 12 carry the same reference numerals.

Figure 13:
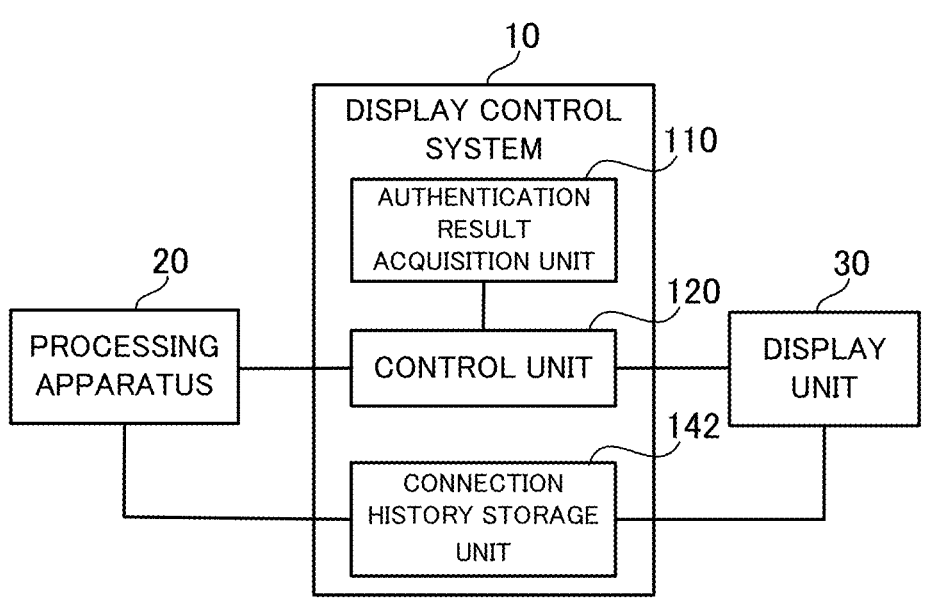
FIG. 13 is a block diagram illustrating a functional configuration of a display control system according to an eighth example embodiment.

As illustrated in FIG. 13, the display control system 10 according to the eighth example embodiment includes, as processing blocks for realizing its functions, the authentication result acquisition unit 110, the control unit 120, and a connection history storage unit 142. That is, the display control system 10 according to the eighth example embodiment further includes a connection history storage unit 142 in addition to the components in the first example embodiment (see FIG. 2). The connection history storage unit 142 may be realized or implemented in the storage apparatus 14 (see FIG. 1), for example.

The connection history storage unit 142 is configured to store information indicating a time in which the display control system 10 is connected to the display unit 30. Alternatively, the connection history storage unit 142 may be configured to store information indicating a time in which the display control system 10 is not connected to the display unit 30. The information stored in the connection history storage unit 142 is viewable by a qualified user or system manager or the like, for example.

(Technical Effect)

Next, a technical effect obtained by the display control system 10 according to the eighth example embodiment will be described.

As described in FIG. 13, in the display control system 10 according to the eighth example embodiment, a connection history of a connection to the display unit 30 is stored by the connection history storage unit 142. In this way, it is possible to reduce illegal actions or the like due to a reconnection of the display unit 30. Specifically, by confirming the connection history, it is possible to specify a time zone in which the display unit 30 is not connected. Thus, it is possible to discover the illegal actions that are performed by disconnecting a video signal cable from the display control system 10 that is configured as an edge terminal or the like and directly connecting another display apparatus to the processing apparatus 20, for example.

Ninth Example Embodiment

The display control system 10 according to a ninth example embodiment will be described with reference to FIG. 14 and FIG. 15. The ninth example embodiment is partially different from the first to eighth example embodiments only in the operation, and may be the same as the first example embodiment in the hardware configuration or the like (see FIG. 1). For this reason, a description of the parts that overlap the already-described parts will be omitted as appropriate.

(Functional Configuration)

First, with reference to FIG. 14, a functional configuration of the display control system 10 according to the ninth example embodiment will be described. FIG. 14 is a block diagram illustrating the functional configuration of the display control system according to the ninth example embodiment. In FIG. 14, the same components as those illustrated in FIG. 2, FIG. 8, FIG. 11, FIG. 12, and FIG. 13 carry the same reference numerals.

Figure 14:
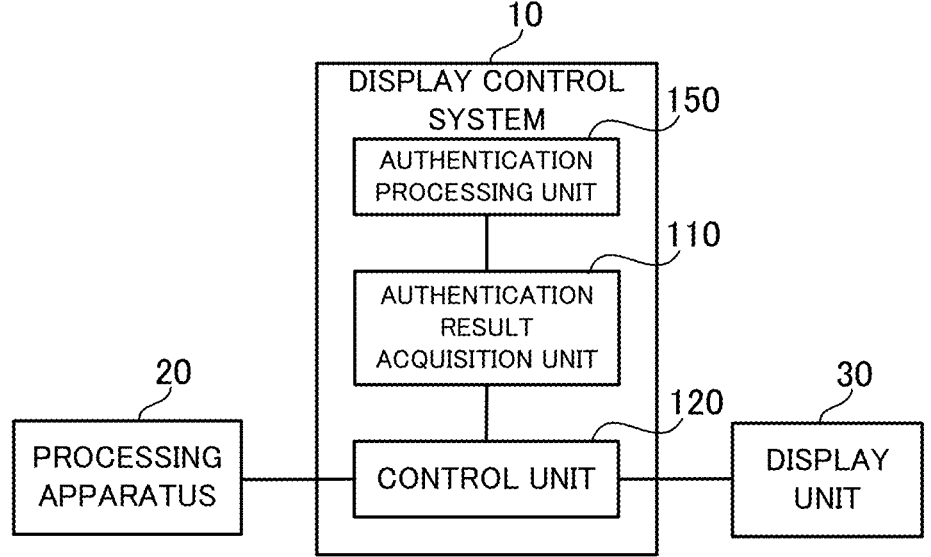
FIG. 14 is a block diagram illustrating a functional configuration of a display control system according to a ninth example embodiment.

As illustrated in FIG. 14, the display control system 10 according to the ninth example embodiment includes, as processing blocks for realizing its functions, the authentication result acquisition unit 110, the control unit 120, and an authentication processing unit 150. That is, the display control system 10 according to the ninth example embodiment further includes an authentication processing unit 150 in addition to the components in the first example embodiment (see FIG. 2). The authentication processing unit 150 may be realized or implemented in the processor (see FIG. 1), for example.

The authentication processing unit 150 is configured to obtain a biometric information from a user and to perform the biometric authentication. The authentication processing unit 150 holds a registrant database, for example, and performs an authentication process by collating the obtained biometric information of the user with information stored in the registrant database. The authentication processing unit 150 is configured to output the result of the biometric authentication to the authentication result acquisition unit 110.

The authentication processing unit 150 is configured to perform face authentication using the user's face image, as an example of the biometric authentication. The authentication processing unit 150 obtains the user's face image from a not-illustrated camera and performs the face authentication, for example. In the face authentication, the existing methods can be adopted as appropriate, and an example of the methods is a method using a feature point information. In this case, the authentication processing unit 150 extracts the feature point information from the user's face image and performs a matching process or matching it with the feature point information stored in the registrant database in advance. Then, the authentication processing unit 150 determines that the authentication is successful when a matching score outputted as a result of the matching process is higher than a predetermined threshold, and determines that the authentication is failed when the matching score is lower than the predetermined threshold.

(Flow of Operation)

Next, with reference to FIG. 15, a flow of operation of the display control system 10 according to the ninth example embodiment will be described. FIG. 15 is a flowchart illustrating the flow of the operation of the display control system according to the ninth example embodiment. In FIG. 15, the same steps as those illustrated in FIG. 3, FIG. 7 and FIG. 9 carry the same reference numerals.

Figure 15:
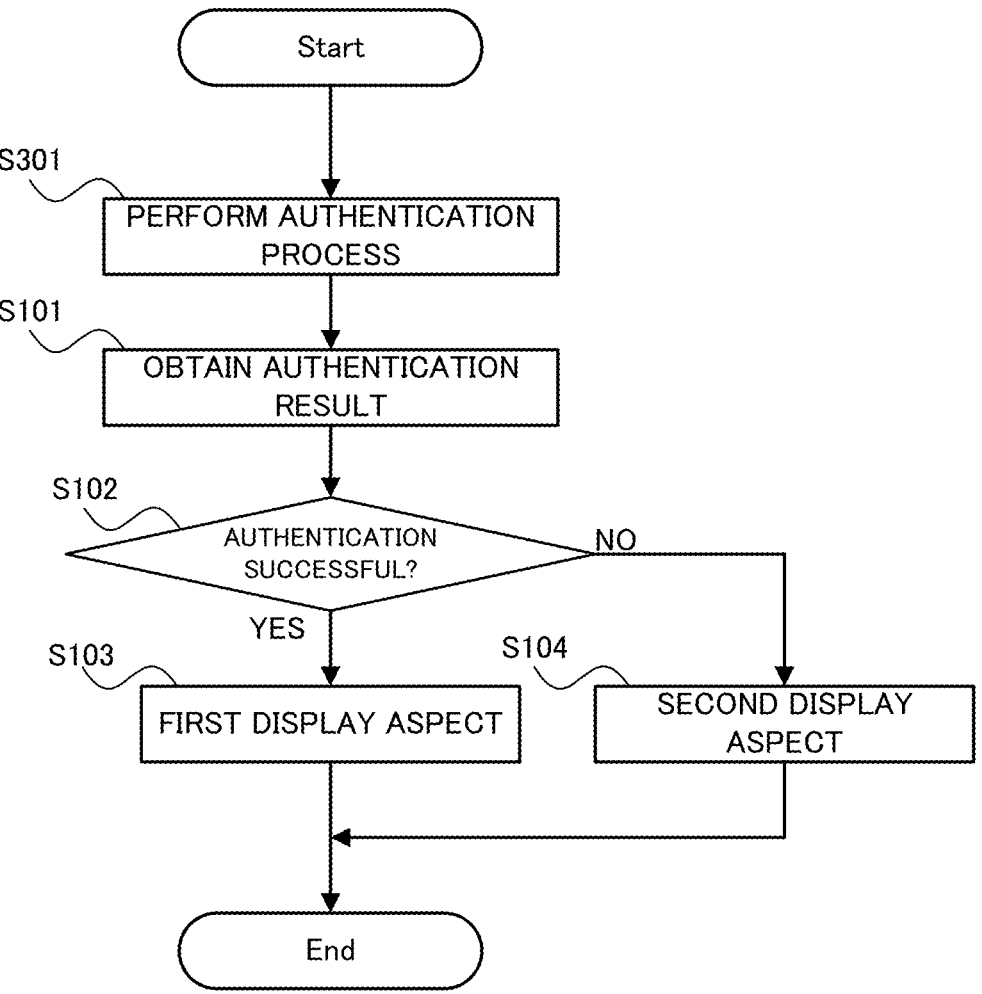
FIG. 15 is a flowchart illustrating a flow of operation of the display control system according to the ninth example embodiment.

As illustrated in FIG. 15, in operation of the display control system 10 according to the ninth example embodiment, first, the authentication processing unit 150 obtains the biometric information about the user and performs the authentication process (step S301). Then, the authentication result acquisition unit 110 obtains the result of the biometric authentication in the authentication processing unit 150 (the step S101).

Subsequently, the control unit 120 determines whether or not the biometric authentication is successful (the step S102). When the biometric authentication is successful (the step S102: YES), the control unit 120 sets the display aspect of the display unit 30 to the first display aspect (the step S103). On the other hand, when the biometric authentication is failed (step S102: NO), the control unit 120 sets the display aspect of the display unit 30 to the second display aspect (the step S104).

(Technical Effect)

Next, a technical effect obtained by the display control system 10 according to the ninth example embodiment will be described.

As described with reference to FIG. 14 and FIG. 15, in the display control system 10 according to the ninth example embodiment, the biometric authentication of the user is performed in the authentication processing unit 150 in the system. Therefore, it is possible to omit a process regarding information transfer about the biometric authentication, compared with the biometric authentication that is performed externally. Therefore, it is possible to simplify and shorten a time of the process required for the biometric authentication.

The above-described example describes the face authentication as an example of the biometric authentication performed by the authentication processing unit 150, but a biometric authentication other than the face authentication may be performed. Specifically, the following may be performed: fingerprint authentication or palm print authentication, palm shape authentication, vein authentication, pulse or heart rate authentication, iris authentication, retina authentication, ear recognition, brain wave authentication, DNA authentication, handwriting authentication, typing authentication, voice authentication, lip reading authentication, blink authentication, gait identification, appearance authentication, and so on. When the fingerprint authentication is adopted as the biometric authentication, information presentation (e.g., an instruction by touching a fingerprint sensor with a finger) for periodically obtaining a fingerprint information may be performed to the user.

<Supplementary Notes>

The example embodiments described above may be further described as, but not limited to, the following Supplementary Notes below.

(Supplementary Note 1)

A display control system described in Supplementary Note 1 is a display control system including: an acquisition unit that periodically obtains a result of a biometric authentication of a user who uses a processing apparatus; and a control unit that controls a display aspect of a display unit that displays an output result of the processing apparatus in accordance with the result of the biometric authentication.

(Supplementary Note 2)

A display control system described in Supplementary Note 2 is the display control system described in Supplementary Note 1, wherein the control unit blocks an output of the output result to the display unit when the biometric authentication is failed.

(Supplementary Note 3)

A display control system described in Supplementary Note 3 is the display control system described in Supplementary Note 1, wherein the control unit outputs information that is different from the output result to the display unit when the biometric authentication is failed.

(Supplementary Note 4)

A display control system described in Supplementary Note 4 is the display control system described in Supplementary Note 1, wherein the control unit controls a screen display of the display unit to be frozen when the biometric authentication is failed.

(Supplementary Note 5)

A display control system described in Supplementary Note 5 is the display control system described in any one of Supplementary Notes 1 to 4, further including a storage unit that stores the result of the biometric authentication.

(Supplementary Note 6)

A display control system described in Supplementary Note 6 is the display control system described in any one of Supplementary Notes 1 to 5, further including an output unit that outputs a specific information about the display unit to the processing apparatus, regardless of the result of the biometric authentication.

(Supplementary Note 7)

A display control system described in Supplementary Note 7 is the display control system described in any one of Supplementary Notes 1 to 6, wherein the biometric authentication is a face authentication.

(Supplementary Note 8)

A display control system described in Supplementary Note 8 is the display control system described in any one of Supplementary Notes 1 to 7, further including an authentication processing unit that obtains a biometric information about the user, performs the biometric authentication, and outputs the result of the biometric authentication to the acquisition unit.

(Supplementary Note 9)

A display control method described in Supplementary Note 9 is a display control method including: periodically obtaining a result of a biometric authentication of a user who uses a processing apparatus; and controlling a display aspect of a display unit that displays an output result of the processing apparatus in accordance with the result of the biometric authentication.

(Supplementary Note 10)

A computer program described in Supplementary Note 10 is a computer program that operates a computer: to periodically obtain a result of a biometric authentication of a user who uses a processing apparatus; and to control a display aspect of a display unit that displays an output result of the processing apparatus in accordance with the result of the biometric authentication.

(Supplementary Note 11)

A recording medium described in Supplementary Note 11 is a recording medium on which a computer program is recorded, the computer program operating a computer: to periodically obtain a result of a biometric authentication of a user who uses a processing apparatus; and to control a display aspect of a display unit that displays an output result of the processing apparatus in accordance with the result of the biometric authentication.

This disclosure is not limited to the examples described above and is allowed to be changed, if desired, without departing from the essence or spirit of this disclosure which can be read from the claims and the entire specification. A display control system, a display control method, a computer program, and a recording medium with such changes are also intended to be within the technical scope of this disclosure.

To the extent permitted by law, this application is based upon and claims the benefit of priority of the prior Japanese Patent Application No. 2020-156527, filed on Sep. 17, 2020, the entire disclosure of which is hereby incorporated by reference. Furthermore, to the extent permitted by law, all publications and papers described in the description are incorporated herein by reference.

DESCRIPTION OF REFERENCE CODES

10 Display control system
20 Processing apparatus
30 Display unit
110 Authentication result acquisition unit
120 Control unit
130 Log storage unit
135 Registered person addition unit
140 Specific information output unit
141 Specific information storage unit
142 Connection history storage unit
150 Authentication processing unit

What is claimed is:

1. A display control system comprising:
at least one memory storing instructions; and
at least one first processor that is configured to execute the instructions to:
  obtain a result of a biometric authentication of a user who uses a processing apparatus, the processing apparatus being configured to request operation;
  in a case where information identifying the processing apparatus is registered in the display control system, control a display to display a first screen for the operation based on the result of the biometric authentication; and
  in a case where information identifying the processing apparatus is not registered in the display control system, restricting operation by controlling to display a second screen regardless of the result of the biometric authentication, the second screen displaying different information from the first screen.

2. The display control system according to claim 1, wherein the at least one first processor is further configured to execute the instructions to block control to the result to the display in a case where the biometric authentication is failed.

3. The display control system according to claim 1, wherein the at least one first processor is further configured to execute the instructions to output information to the display that is different from information that is output to the display in a case where the biometric authentication failed.

4. The display control system according to claim 1, wherein the at least one first processor is further configured to execute the instructions to control a screen display of the display to be frozen in a case where the biometric authentication failed.

5. The display control system according to claim 1, wherein the at least one first processor is further configured to execute instructions to obtain a biometric information about the user, perform the biometric authentication, and output the result of the biometric authentication.

6. The display control system according to claim 1, wherein the at least one first processor is further configured to execute the instructions to store log regarding the biometric authentication, the log indicating a time at which the biometric authentication is executed.

7. The display control system according to claim 1, wherein the at least one first processor is further configured to execute the instructions to store a log regarding a time at which connection occurs.

8. The display control system according to claim 1, wherein the at least one first processor is further configured to execute the instructions to register the processing apparatus at a time at which initial setting occurs.

9. A display control method performed by a computer and comprising:
  obtaining a result of a biometric authentication of a user who uses a processing apparatus, the processing apparatus configured to request operation;
  in a case where information identifying the processing apparatus is registered in a system, controlling a display to display a first screen for the operation based on the result of the biometric authentication; and
  in a case where information identifying the processing apparatus is not registered in the system, restricting operation by controlling to display a second screen regardless of the result of the biometric authentication, the second screen displaying different information from the first screen.

10. The display control method according to claim 9, further comprising blocking control to output the result to the display in a case where the biometric authentication failed.

11. The display control method according to claim 9, further comprising storing log regarding the biometric authentication, the log indicating a time at which the biometric authentication is executed.

12. The display control method according to claim 9, further comprising storing a log regarding a time at which connection occurs.

13. The display control method according to claim 9, wherein the biometric authentication includes face authentication.

14. The display control method according to claim 9, wherein registering the processing apparatus is executed at a time at which initial setting occurs.

15. The display control method according to claim 9, wherein the information identifying the processing apparatus is information other than biometric authentication information.

16. The display control method according to claim 9, wherein the information identifying the processing apparatus is information other than facial information.

17. The display control method according to claim 9, wherein the information identifying the processing apparatus is information uniquely identifying the processing apparatus.

18. The display control method according to claim 9, wherein the information identifying the processing apparatus is information indicating that the processing apparatus is a system-registered apparatus.

19. The display control method according to claim 9, wherein the information identifying the processing apparatus is different from any biometric information necessary for the biometric authentication.

20. A non-transitory recording medium storing a computer program executable by a computer to perform a display control method comprising:

obtaining a result of a biometric authentication of a user who uses a processing apparatus, the processing apparatus configured to request operation;

in a case where information identifying the processing apparatus is registered in a system, controlling a display to display a first screen for the operation based on the result of the biometric authentication; and in a case where information identifying the processing apparatus is not registered in a system, restricting operation by controlling to display a second screen regardless of the result of the biometric authentication, the second screen displaying different information from the first screen.

* * * * *